US006182637B1

(12) United States Patent
Kilgore et al.

(10) Patent No.: US 6,182,637 B1
(45) Date of Patent: Feb. 6, 2001

(54) DAMPER CONTAINING INTERNAL LUBRICANT

(75) Inventors: Jason T. Kilgore; Joseph K. Cecelic, both of Newport News, VA (US)

(73) Assignee: Siemens Automotive Corporation, Auburn Hills, MI (US)

( * ) Notice: Under 35 U.S.C. 154(b), the term of this patent shall be extended for 0 days.

(21) Appl. No.: 09/432,573

(22) Filed: Nov. 12, 1999

(51) Int. Cl.[7] ............................ F02M 41/00; F16L 55/02
(52) U.S. Cl. ............................................ 123/467; 138/30
(58) Field of Search ............................ 123/467; 251/355; 138/30; 137/510

(56) References Cited

U.S. PATENT DOCUMENTS 3,967,363 * 7/1976 Meyer .................................... 29/434
4,051,865 * 10/1977 Cocking et al. ..................... 137/355
4,089,919 * 5/1978 Sanson .
4,164,954 * 8/1979 Ballard ................................ 137/510
4,685,491 * 8/1987 Fulmer et al. ......................... 138/30
5,094,433 * 3/1992 Dan et al. ............................. 138/30
6,032,651 * 3/2000 Field .................................. 123/467

* cited by examiner

*Primary Examiner*—Thomas N. Moulis

(57) ABSTRACT

The present invention provides a damper for a fuel system. The damper includes a first chamber with an interior surface, and a second chamber with a fuel receiving opening. A diaphragm separates the first chamber and the second chamber. A device is disposed within the first chamber that biases the diaphragm toward the fuel receiving opening. A retainer, which supports the device proximate the diaphragm, is located in the first chamber. The retainer has a surface exposed to the interior surface of the first chamber. A lubricant is disposed on at least one of the interior surface of the first chamber and the surface of the retainer.

20 Claims, 1 Drawing Sheet

DAMPER CONTAINING INTERNAL LUBRICANT

FIELD OF INVENTION

This invention relates to a damper for automotive fuel systems, and more particularly, a damper for minimizing fuel pressure pulsations in a fuel rail.

BACKGROUND OF INVENTION

Existing fuel delivery systems which use an in-tank fuel pressure regulator usually employ an energy absorbing device mounted on or near the fuel rail. The energy absorbing device serves to compensate for fuel pressure pulsations created in the fuel rail that occur as a result of sequential firing of fuel injectors operatively connected to the fuel rail. A known energy absorbing device is a damper mounted on the fuel rail. A damper of this type is disclosed in commonly-assigned, co-pending U.S. patent application Ser. No. 09/086,084, entitled "Fuel Rail Damper", filed May 28, 1998, which is incorporated herein in its entirety by reference. This known damper has an upper chamber and a lower chamber separated by a solid, flexible diaphragm. The upper chamber contains a spring that biases the diaphragm toward the lower chamber. The spring is retained in a spring seat, which engages the diaphragm. The lower chamber has an opening which allows fuel to enter from the fuel rail and contact the diaphragm. Changes in fuel pressure cause the diaphragm to adjust the volumetric capacity of the lower chamber to damp the fuel pressure changes.

Applicants have discover that over prolonged periods of operation, the known damper can exhibit reduced operative capacity. As the diaphragm adjusts the volume of the lower chamber, the spring seat reciprocates within the upper chamber. While reciprocating in the upper chamber, the spring seat can become galled from contacting the upper chamber, even though the spring seat is sized to minimize contact with the upper chamber. It is believed that a spring seat with galled surfaces can reduce operability of the damper. Thus, a damper arrangement is needed which can, under prolonged operative conditions, maintain a stable damping coefficient.

SUMMARY OF THE INVENTION

The present invention provides a damper for a fuel system. The damper includes a first chamber with an interior surface, and a second chamber with a fuel receiving opening. A diaphragm separates the first chamber and the second chamber. A device is disposed within the first chamber that biases the diaphragm toward the fuel receiving opening. A retainer, which supports the device proximate the diaphragm, is located in the first chamber. The retainer has a surface exposed to the interior surface of the first chamber. A lubricant is disposed on at least one of the interior surface of the first chamber and the surface of the retainer.

In a preferred embodiment, the retainer is a spring seat and the device biasing the diaphragm is a spring. The seat is a cup-shaped member having a lateral side surface exposed to the interior surface of the first chamber. The lubricant is disposed on the lateral side surface, and is, preferably, disposed on the lateral side surface by a lubricity additive of a plating disposed on the lateral side surface.

The present invention also provides a method of damping pressure pulsations in a fuel system. The method is accomplished by separating a housing into a first chamber and a second chamber with a diaphragm; providing the second chamber having a fuel receiving opening; disposing a device in the first chamber that biases the diaphragm toward the fuel receiving opening; supporting the device proximate the diaphragm with a retainer; and providing lubricant between the retainer and the first chamber.

BRIEF DESCRIPTION OF THE DRAWINGS

The accompanying drawing, which is incorporated herein and constitutes part of this specification, illustrates a presently preferred embodiment of the invention, and, together with the general description given above and the detailed description given below, serve to explain features of the invention.

DETAILED DESCRIPTION OF THE PREFERRED EMBODIMENT

Figure 1:
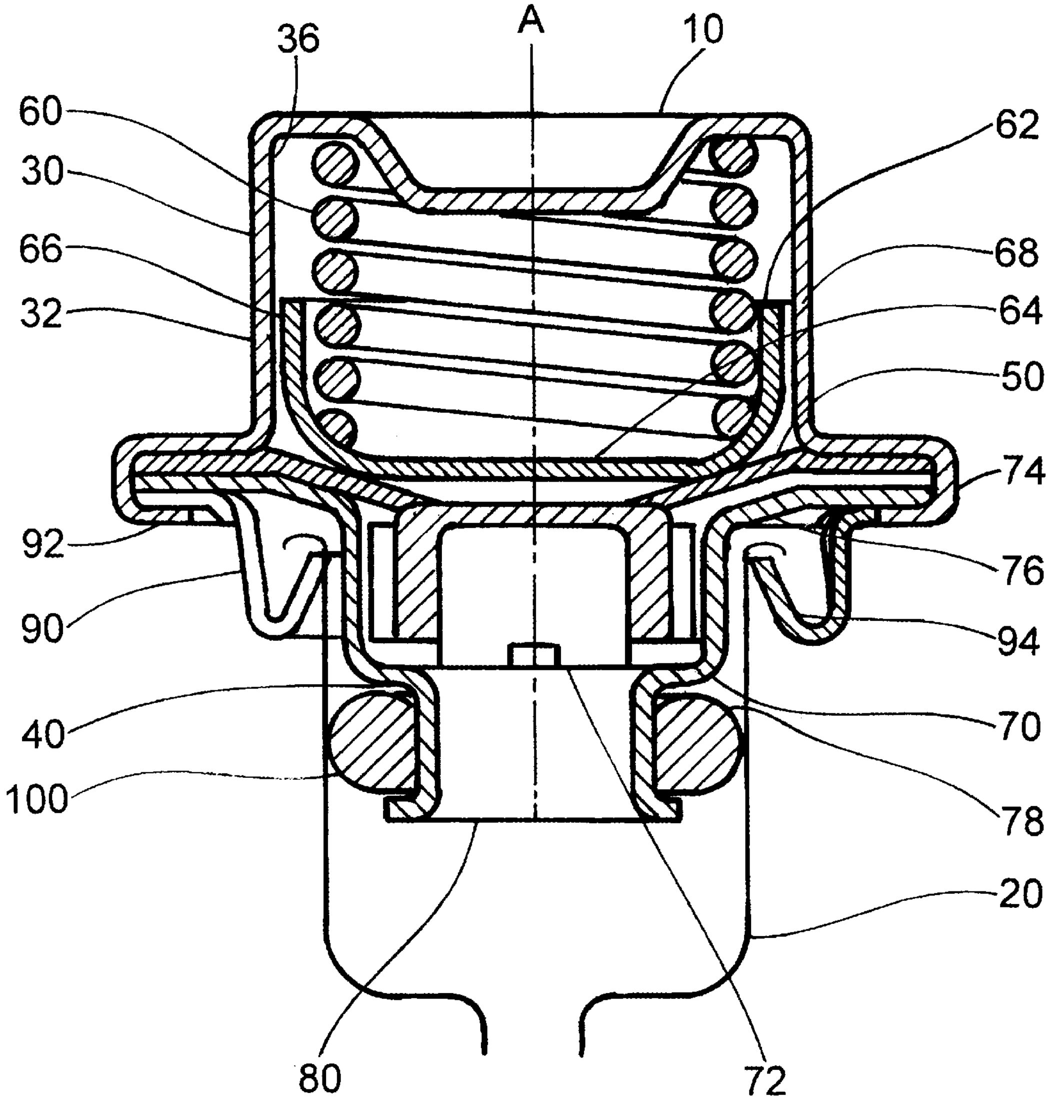
FIG. 1 is a cross-sectional view of an embodiment of the damper of the present invention.

FIG. 1 illustrates a preferred embodiment of the damper 10 that attenuates pressure pulsations in a fuel system. The damper 10 is, preferably, an assembly of components operatively attached to a fuel rail (not shown) by a fuel rail cup 20. The damper 10 includes an upper chamber 30, a first chamber, and the lower chamber 40, a second chamber. The upper chamber 30 and the lower chamber 40 are separated by a flexible diaphragm 50 within the damper assembly. The diaphragm 50 is secured in place between the upper chamber 30 and lower chamber 40. The upper chamber 30 is formed by a first member of the assembly, which is, preferably, a cover 32 that creates a sealed chamber with the diaphragm 50. A biasing device, which is, preferably, a spring 60 and, a retainer for the biasing device, which is, preferably, a spring seat 62, are disposed in the upper chamber 30. The spring seat 62 engages the diaphragm 50 so that the spring 60 biases the diaphragm 50 toward the lower chamber 40.

The lower chamber 40 is formed by a second member of the damper assembly, which is preferably, a housing 70. Although the damper assembly in the preferred embodiment is provided by two separate members, cover 32 and housing 70, a unitary member could be provided. The lower end of the housing 70 has an opening 72, a fuel receiving opening, which allows fuel to enter the damper 10 from the fuel system. The upper end of the housing 70 has a flange 74 that supports the diaphragm 50. The flange 74 is surrounded by a flange 34 of cover 32. A portion of the flange 74 projects inwardly to provide a radial shoulder 76. The radial shoulder 76 allows for a maximum effective area of the diaphragm 50 to be exposed to fuel in the lower chamber 40.

A spacer 80 is disposed in the lower chamber 40 and contacts a seat 78 formed in the housing 70. The seat 78 limits axial movement of the spacer 80 toward the opening 72. The force of spring 60 limits axial movement of the spacer 80 toward the cover 32. The height of the spacer 80, in the axial direction along the longitudinal axis A, is greater than the distance between the seat 78 and an inner edge of the radial shoulder 76, and, preferably, is greater than the distance between the seat 78 and the flange 74. The spacer 80, therefore, prevents contact between the diaphragm 50 and the radial shoulder 76. Because contact is prevented between the diaphragm 50 and the radial shoulder 76, the diaphragm 50 does not adhere to the radial shoulder 76, even after prolonged exposure to heat and fuel. By avoiding contact with the radial shoulder 76, a maximum effective area of the diaphragm 50 is continually exposed to the lower chamber 40. Further details of the spacer 80, and its operative performance within the damper 10, is explained in co-pending application U.S. patent application Ser. No. 09/438,291 entitled "Pressure Pulsation Damper with Free Floating Spacer," filed on even date, which is hereby incorporated in its entirety by reference.

The damper 10 is attached to the fuel cup 20 by a clip 90 comprising a support portion 92 on an outer diameter and a plurality of retention members 94 on an inner diameter. Further details of this clip are disclosed in commonly-assigned, co-pending U.S. patent application Ser. No. 09/342,589 entitled "A Self-Tightening Clip", filed Jun. 29, 1999, which is also hereby incorporated in its entirety by reference. The support portion 92 of the clip 90 is disposed between the flange 74 of the housing 70 and the flange 34 of the cover 32. The clip retention members 94 extend over a lip on the fuel cup 20 to maintain the damper 10 in place on the fuel cup 20. An O-ring 100, disposed on the housing 70, provides a seal between the damper 10 and the fuel cup 20.

During operation of the damper 10, the spring seat 62 reciprocates along the longitudinal axis A. The spring seat 62, which serves as the preferred retainer, is a cup-shaped member having a diaphragm engagement face 64. The engagement face 64 is connected to a lateral side surface 66 by a rounded outer edge 68. The engagement face 64 of the spring seat 62 and a surface of the spacer 80 provide opposing structural members that apply opposite axial loads along longitudinal axis A to the diaphragm 50. The engagement face 64 has a contact area less than the effective contact area of the diaphragm 50, due to the rounded outer edge 68. By providing the engagement face 64 with this configuration, the spring seat 62 biases the diaphragm 50 without biasing the spring seat 62 against the radial shoulder.

Reciprocation of the spring seat 62, reciprocates lateral side surface 66 of the spring seat 62 relative to an interior surface 36 of the cover 32. The lateral side surface 66 of the spring seat 62 and the interior surface 36 of the cover 32 are, preferably, planar surfaces that extend substantially parallel to the longitudinal axis A. In the preferred embodiment, the lateral side surface 66 and the interior surface 36 have a corresponding circumferential configuration, which is, preferably, circular, although other corresponding circumferential configuration could be employed. The corresponding circumferential configuration of the lateral side surface 66 and the interior surface 36 allows for a compact damper assembly. Even though the spring seat 62 is sized so that the lateral side surface 66 should avoid contact with the interior surface 36 of the cover 32, applicants have discover that under particular operative conditions, the damper 10 can demonstrate a reduced damping capacity because of frictional forces developed when the lateral side surface 66 contacts the interior surface 36. Prolonged contact between the lateral side surface 66 and the interior surface 36 cause frictional forces that can gall the metallic material employed selected for these surfaces, which can result in a permanent reduction in the operative capacity of the damper 10.

In order to minimize the frictional contact between the lateral side surface 66 and the interior surface 36, a method of lubricating at least one of these internal surfaces is provided. For example, a lubricant is provided on at least one of the lateral side surface 66 or the interior surface 36. In addition to providing an arrangement that minimizes frictional contact between the lateral side surface 66 and the interior surface 36, and, thus, prevents galling of the lateral side surface 66 and the interior surface 36, lubrication of at least one of these surfaces within the damper, also, advantageously, improves the performance of the damper 10 during various operative conditions. Time interval performance tests have demonstrated at least a twenty percent increase in the damping coefficient of the damper of the preferred embodiment with internal surface lubrication as compared to a damper of the preferred embodiment without internal surface lubrication.

The selected method of lubricating the lateral side surface 66 or the internal surface 36 provides for internal surface lubrication of the damper assembly. The internal surface lubrication of the damper assembly can be achieved by various arrangements, each of which provides alternative embodiments of the damper 10. It is to be understood that each of the various arrangements that provide a method of internal surface lubrication could be employed singularly or in a combination thereof. To provide lubrication of the specified surfaces, the lateral side surface 66 and the interior surface 36, any medium that reduces frictional forces between the specified surfaces can be employed. The medium could be, for example, oil, grease, or a lubricity additive in an appropriate material exposed to at least one of the specified surfaces. The medium should at least provide a thin layer of a lubricating substance on at least one of the specified surfaces. That is, if an oil or grease is used as the medium, a thin layer of the selected oil or grease is applied to at least one of the lateral side surface 66 and the interior surface 36, and, in particular, the lateral side surface 66. If a material with the lubricity additive is employed as the medium, the material that contains the lubricity additive could be the material employed to form at least one of the spring seat 62 and the cover 32, or a plating applied to at least one of the specified surfaces, the lateral side surface 66 or the interior surface 36, as long as during relative movement of the specified surfaces, the selected material provides a thin layer of a lubricating substance to at least one of the specified surface. An example of such a material, which could be used as the material to form one of the spring seat 62 or the cover 32 and provide a lubricating substance to at least one of the specified surfaces, is an oil impregnated steel. In the preferred embodiment, the medium is a plating of electroless nickel with Teflon, polytetrafluoroethylene, additives. The plating 68 is applied to spring seat 62 so that the at least lateral side surface 66 is covered. The nickel plated spring seat 62 is, preferably, formed from a stainless steel.

While the invention has been disclosed with reference to certain preferred embodiments, numerous modifications, alterations, and changes to the described embodiments are possible without departing from the sphere and scope of the invention, as defined in the appended claims and their equivalents thereof. Accordingly, it is intended that the invention not be limited to the described embodiments, but that it have the full scope defined by the language of the following claims.

What we claim is:

1. A damper for a fuel system, comprising:

a first chamber having an interior surface;

a second chamber having a fuel receiving opening;

a diaphragm separating the first chamber and the second chamber;

a device disposed within the first chamber that biases the diaphragm toward the fuel receiving opening;

a retainer supporting the device proximate the diaphragm, the retainer having a surface exposed to the interior surface of the first chamber; and a lubricant disposed on at least one of the interior surface of the first chamber and the surface of the retainer.

2. The damper of claim 1, wherein the retainer comprises a seat.

3. The damper of claim 2, wherein the seat comprises a cup-shaped member having a lateral side surface exposed to the interior surface of the first chamber.

4. The damper of claim 3, wherein the lubricant is disposed on the lateral side surface of the seat.

5. The damper of claim 4, wherein the lubricant comprises an additive of a plating disposed on the lateral side surface.

6. The damper of claim 1, wherein the device that biases the diaphragm comprises a spring and; wherein the retainer comprises a spring seat having a face that engages the diaphragm and a lateral side surface, the face having a contact area less than an effective area of the diaphragm, the lateral side surface providing the surface of the retainer exposed to the interior surface.

7. The damper of claim 1, further comprising a spacer disposed in the second chamber that maintains a maximum effective area of the diaphragm.

8. The damper of claim 1, wherein the lubricant comprises at least one of an oil, grease, and a lubricity additive in a material.

9. The fuel injector of claim 1, further comprising a housing that provides the first chamber and the second chamber.

10. The damper of claim 9, wherein the housing includes a retention device, the retention device being configured to secure the damper to a fuel rail cup.

11. The damper of claim 10, wherein the retention device comprises a sheet metal clip integrally attached to the housing.

12. The damper of claim 11, wherein the housing comprises a first member that provides the first chamber and a second member that provides the fuel receiving opening, the first member including a first flange, the second member including a second flange; and wherein the clip includes a support portion and a plurality of retention members, the support portion being disposed between the first flange and the second flange, and the plurality of retention members extending from the support member toward the fuel receiving opening.

13. The damper of claim 12, wherein the second chamber comprises an inwardly angled radial shoulder adjacent the diaphragm.

14. A method of damping pressure pulsations in a fuel system comprising the steps of:

separating a housing into a first chamber and a second chamber with a diaphragm;

providing the second chamber having a fuel receiving opening;

disposing a device in the first chamber that biases the diaphragm toward the fuel receiving opening;

supporting the device proximate the diaphragm with a retainer; and providing lubricant between the retainer and the first chamber.

15. The method of damper of claim 14, further comprising the steps of:

providing a cup-shaped member as the retainer, the cup-shaped member having a lateral side surface exposed to an interior surface of the first chamber.

16. The method of claim 15, further comprising the step of:

providing a plating with a lubricity additive on the lateral side surface.

17. The method of claim 15, further comprising the step of:

providing the retainer with a face that engages the diaphragm, the face having a contact area less than an effective area of the diaphragm.

18. The method of claim 14, further comprising the step of:

disposing a spacer in the second chamber that maintains a maximum effective area of the diaphragm.

19. The method of claim 14, further comprising the step of:

providing at least one of an oil, grease, and a lubricity additive in a material as the lubricant.

20. The method of claim 14, further comprising the steps of:

providing for the first chamber with a first member of a housing;

providing the second chamber with a second member of a housing; and disposing a support portion of a clip between a first flange of the first member and a second flange of the second member so that a plurality of retention members of the clip extend from a support member toward the fuel receiving opening.

* * * * *